United States Patent [19]

Tabata et al.

[11] Patent Number: 5,061,371
[45] Date of Patent: Oct. 29, 1991

[54] CHROMATOGRAPHIC SEPARATION APPARATUS

[75] Inventors: Takeshi Tabata; Soichiro Ide, both of Shizuoka; Akihiko Moro, Tokyo; Ryuji Nagatani, Kanagawa, all of Japan

[73] Assignees: Nippon Rensui Co., Tokyo; Fujisawa Pharmaceutical Co., Ltd., Osaka, both of Japan

[21] Appl. No.: 505,396

[22] Filed: Apr. 6, 1990

[51] Int. Cl.$^5$ ............................................. B01D 15/08
[52] U.S. Cl. ................................. 210/198.2; 210/104; 210/143
[58] Field of Search ................... 210/86, 91, 104, 110, 210/143, 198.2, 275, 277, 662

[56] References Cited

U.S. PATENT DOCUMENTS

| | | | |
|---|---|---|---|
| 2,850,438 | 9/1958 | Bodkin | 210/104 |
| 2,904,518 | 9/1959 | Shea | 210/104 |
| 3,279,604 | 10/1966 | Leviel | 210/104 |
| 3,512,640 | 5/1970 | Hellman | 210/104 |
| 3,852,193 | 12/1974 | Jakubek | 210/104 |
| 3,960,726 | 6/1976 | Peterson | 210/104 |
| 4,133,759 | 1/1979 | Ikeda | 210/104 |

Primary Examiner—Ernest G. Therkorn
Attorney, Agent, or Firm—Sughrue, Mion, Zinn, Macpeak & Seas

[57] ABSTRACT

A chromatographic separation apparatus having a packed column comprising a packed layer, a retained liquid layer above the packed layer, and liquid-feed piping connected to a space above the retained liquid layer and having a flow controller: comprising flow-liquid discharge piping being connected to the bottom of the packed column and having a flow controller, a liquid-level detecting element being provided at the top of the packed column, and a plurality of interface-detecting elements being provided at the inside wall of the packed column; and electrical connection being made so that a first electric signal of the height of the packed layer is transmitted from the interface-detecting element to a controller constituted of a signal converter, an electric current generator, an addition-computing element, and an adjuster; and a second electric signal is transferred from the liquid-level detector provided at the top of the column to the adjuster; and output signal is transmitted from the adjuster to the first controller of the liquid-feed piping and the second controller of the discharging piping.

5 Claims, 1 Drawing Sheet

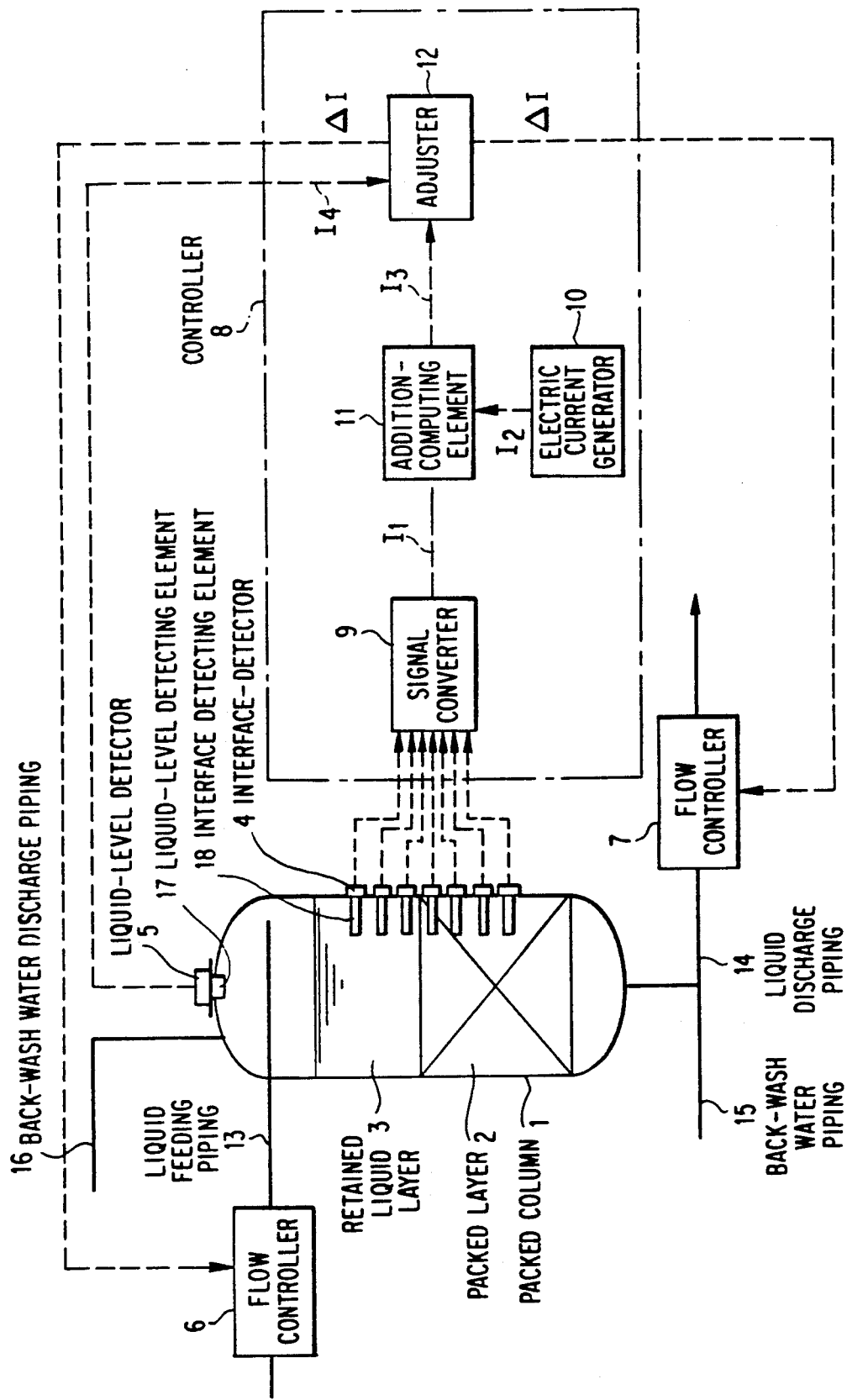

CHROMATOGRAPHIC SEPARATION APPARATUS

FIELD OF THE INVENTION

The present invention relates to a chromatographic separation apparatus for separating a component from a liquid containing the component to be separated (hereinafter referred to as the unseparated liquid) by passing the unseparated liquid and an eluting liquid through a packed layer of a separating agent according to chromatography.

More particularly, the present invention relates to a chromatographic separation apparatus in which the layer of the unseparated liquid or of an eluting liquid is held in a specific layer thickness above the packed layer, and the liquid is allowed to flow with the thickness of the layer being maintained.

BACKGROUND OF THE INVENTION

The chromatographic separation, which enables separation of a desired component from a solution containing a plurality of dissolved components in a simple manner with less energy, has come to be utilized industrially in the fields of separation and purification of medicines, foods, and the like.

For the chromatographic separation apparatuses employed therefor, two types of packed columns are known: namely, a first type of packed columns in which a separating agent is packed throughout the entire column, and a second type of packed columns in which a separating agent is packed partially in the column so as to keep a space in the top portion of the column for allowing back-wash of the separating agent (the latter type being referred to hereinafter as "top-spaced type").

In chromatographic separation-purification, the unseparated liquid is pretreated for eliminating suspended matters by filtration or the like procedure, and is then passed through the packed column. After the liquid has been passed for a long period of time, fine suspended matters accumulate in the packed layer in the column, causing pressure drop in the packed column and lowering liquid flow rate, whereby the liquid cannot be passed through under a constant pressure.

Accordingly, the top-spaced type of packed columns, which permit the back-wash for discharging the suspended matter from the packed column, is widely employed in industrial chromatographic separation apparatuses.

In this top-spaced type, generally an unseparated liquid or an eluting liquid is passed through the column by holding and retaining a layer of the respective liquid above the packed layer to prevent any deflection of flow in the packed layer. For high precision chromatographic separation, the thickness of the retained liquid layer should be kept constant within a variable range of from 10 to 20 cm at most.

However, in the case where a separating agent employed is of a polymer type such as an ion-exchange resin, a synthetic organic adsorbent, or the like, the separating agent swells or shrinks depending on the pH, the salt concentration, the liquid properties of the passing liquid, and other factors.

Such a phenomenum, for example, is observed that a strongly acidic cation-exchange resin employed as a packing agent will shrink when an electrolyte solution such as aqueous sodium chloride solution is passed as an elution liquid after passing of the unseparated liquid, and will swell and restore the original volume when the unseparated liquid is passed again.

Accordingly, in a top-spaced type packed column having polymeric separating agent packed therein, not only the thickness of the packed layer but also the packing density of the packed layer incessantly changes gradually, whereby the thickness of the retained liquid layer changes correspondingly.

Such variation of the layer thickness of the retained liquid layer naturally leads to lowering of the separating performance. Therefore, the variation of the layer thickness of the retained liquid needs to be controlled to be smallest during the passing-through of the liquid. The control, however, cannot be successful without extremely troublesome operations.

The chromatographic separation by a conventional top-spaced type of packed column, therefore, is compelled to be conducted with the layer thickness of the retained liquid varying in a considerably broad range. This variation of the layer thickness is accompanied naturally with dilution of the unseparated liquid or the elution liquid by the elution liquid or the unsaturated liquid having been employed in the preceding step, which involves such disadvantage that the purity of the intended substance cannot be raised as desired.

SUMMARY OF THE INVENTION

The object of the present invention is to provide a chromatographic separation apparatus having a top-spaced type packed column, which gives high separation accuracy by maintaining the thickness of the retained liquid layer to be constant (within a variable range of approximately from 10 cm to 20 cm).

The present invention provides a chromatographic separation apparatus having a packed column comprising a packed layer, a retained liquid layer above the packed layer, and liquid-feed piping connected to a space above the retained liquid layer and having a flow controller: comprising flow-liquid discharge piping being connected to the bottom of the packed column and having a flow controller, a liquid-level detecting element being provided at the top of the packed column, and a plurality of interface-detecting elements being provided at the inside wall of the packed column; and electrical connection being made so that a first electric signal of the height of the packed layer is transmitted from the interface-detecting element to a controller constituted of a signal converter, an electric current generator, an addition-computing element, and an adjuster; and a second electric signal is transferred from the liquid-level detector provided at the top of the column to the adjuster; and output signal is transmitted from the adjuster to the first controller at a liquid-feed piping and the second controller at discharging piping.

BRIEF DESCRIPTION OF THE DRAWINGS

FIG. 1 illustrates a flow diagram of the chromatographic separation apparatus of the present invention. In FIG. 1, the numeral 1 denotes a packed column; 2 a packed layer; 3 a retained liquid layer; 4 interface-detectors; 5 a liquid-level detector; 6 a flow controller for the liquid feed piping; 7 a flow controller for liquid discharge piping; 8 a controller which includes a signal converter 9, an electric current generator 10, an addition computing element 11, and an adjuster 12; 13 liquid feed piping; 14 flow-liquid discharge piping; 15 back-wash water piping; 16 back-wash waste water discharge piping; 17 a liquid-level detecting element; and 18 interface-detecting elements.

DETAILED DESCRIPTION OF THE INVENTION

The present invention is described with referring to the figure.

The packed column 1 is filled with a separating agent and water, forming a packed layer 2 and a retained liquid layer 3. A space is provided above the retained liquid layer so that back-wash of the separating agent is practicable.

The separating agents include ion-exchange resins such as strongly acidic cation-exchange resins, strongly basic anion-exchange resins, weakly acidic cation-exchange resins, weakly basic anion-exchange resins, chelate resins, and the like; synthetic adsorbent such as high porous polymer, zeolite, silica gel, ODS silica, and other chromatographic separating agents. Among them, ion-exchanges resins and high porous polymer show the more effectiveness of the present invention since the volume thereof are varied according to a kind of the elute, for example, water or an organic solvent and of the ion-type of the ion-exchange group.

After the packed layer 2 is built up, a predetermined quantity of an unseparated liquid is fed via the flow controller 6 and the liquid feed piping 13 and is allowed to flow through the layer, whereby the objective compound is made to be adsorbed by the separating agent. Subsequently a predetermined quantity of an eluting liquid is fed via the same route as the unseparated liquid, whereby the objective component is eluted and collected together with the eluting liquid via the flow-liquid discharge piping 14 and the flow controller 7. The chromatographic separation is conducted by repeating the procedure above.

During the operation, the thickness of the packed layer 2 and the thickness of the retained liquid layer 3 varies resulting from the variation of the packing density caused by swelling and shrinking of the separating agent, which are monitored by the interface-detectors 4 and the liquid-level detector 5.

The liquid-level detector 5 for monitoring the surface level of the retained liquid layer 3 comprise a liquid-level detecting element 17 of any of a ultrasonic type, a differential pressure type, an electrostatic capacity type, or the like. Among them, ultrasonic type level meter is preferable in the present invention in view of the simplicity of the structure, the precision of the measurement, and other points.

The liquid-level detecting element 17 is required to detect precisely the liquid level of the retained liquid layer 3. Therefore it is provided internally around the top portion of the packed column 1 so as to output electric signals in correspondence with the variation of the liquid level of the retained liquid layer 3.

A plurality of interface-detecting elements 18 for detecting the interface between the packed layer 2 and the retained liquid layer 3 are provided internally on the side wall of the packed column 1 with a certain spacing so as to cover the whole area of the displacements at the interface.

The interface-detecting element 18 may be of any of a vibrator type, a photoelectric tube type, a laser type, and the like, among which the vibrator type level sensor is preferred with respect to being simple in handling. The interface-detecting element 18 outputs electric signals in correspondence with the height of the interface between the packed layer 2 and the retained liquid layer 3.

The interface detector 4 and the liquid-level detector 5 convert the electric signal output of the respective detecting elements into amplified electric signals, and output the signals to the controller 8 for adjusting the layer thickness of the retained liquid layer 3. The process for controlling the thickness of the retained liquid layer 3 in the controller 8 is described in detail below.

The interface-detecting elements 18 are provided on the inside wall of the packed column 1 by taking the base point in the proximity of and below the lowest interface position brought about by shrinking of the separating agent, and by taking into account the uppermost position thereof brought about by swelling of the separating agent, and with constant spacings of from 10 to 20 cm therebetween.

The interface-detecting element 18, which has come to contact with the face of the packed layer 2 as the result of displacement of the interface between the packed layer 2 and the retained liquid layer 3 by feeding the liquid from the level of one interface-detecting element 18 to the level of the adjacent one, outputs digital electric signals. The digital signals are converted to an analog electric signal ($I_1$) by the signal converter 9 incorporated in the controller 8.

The thickness of the retained liquid layer 3 is determined depending on the kind of the separating agent, inside diameter of the packed column 1, and other factors. The thickness to be maintained of the retained liquid layer 3 is controlled by the electric current generator 10 capable of outputting analog electric signals for controlling the ratio of two variables with respect to the thickness and the electric current, within a predetermined ratio.

The electric current generator 10 is exemplified by SMLD made by Yokogawa Electric Works, Ltd.

The electric current generator 10, when the desired thickness of the retained liquid layer 3 is set therein, outputs a constant analog electric signal as an reference electric signal ($I_2$) to the addition-computing element 11.

The addition-computing element 11 computes the addition of the inputted a measured analog electric signal $I_1$ and reference electric signal $I_2$, and outputs, as a calculated analog electric signal ($I_3$), the total of the required thickness of the retained liquid layer 3 and the thickness of the packed layer 2 following the variation of the packed layer 2 to the adjuster 12. The adjuster 12 is exemplified by an SLCD made by Yokogawa Electric Works, Ltd.

On the other hand, the liquid-level detector 5 outputs analog electric signals following the variation of the liquid level in correspondence with the electric signal preliminarily inputted as to the relation of the distance between the liquid-level detecting elements 17 and the retained liquid layer 3, to the adjuster 12 as a measured analog electric signal ($I_4$).

The adjuster 12 computes the difference ($\Delta I$) between the calculated analog electric signal $I_3$ and the measured analog electric signal $I_4$ as the required thickness of the retained liquid layer 3 to be adjusted, and outputs electric signals correspondently. Useful as the adjuster 12 are EKX2234 made by Yokogawa Electric Works, Ltd. and the like.

The electric signals outputted from the controller 8 after the above process are transmitted to the flow controller 6 and the flow controller 7, which respectively control the pump and the control valve to adjust the feed rate and the discharge rate of the unseparated liquid and the eluting liquid, thereby maintaining constant layer thickness of the retained liquid layer 3.

When suspended matters have accumulated in the packed layer 2, and the pressure drop has become increased as the result of the repeated liquid flow operation, back-wash water is introduced through the back-wash water piping 15 to wash the packed layer 2 and discharge the suspended matters with the wash-water from the back-wash waste water discharge piping 16.

The present invention, in chromatographic separation with a top-spaced type packed column, enables highly precise separation because no dilution of the unseparated liquid and of the eluting liquid occur owing to the constant thickness of the retained liquid layer 3 kept at a optional level.

While the invention has been described in detail and with reference to specific embodiments thereof, it will be apparent to one skilled in the art that various changes and modifications can be made therein without departing from the spirit and scope thereof.

What is claimed is:

1. A chromatographic separation apparatus having a packed column comprising a packed layer, a retained liquid layer above the packed layer, and liquid-feed piping connected to a space above the retained liquid layer and having a flow controller: comprising flow-liquid discharge piping being connected to the bottom of the packed column and having a flow controller, a liquid level detecting element being provided at the top of the packed column, and a plurality of interface-detecting elements being provided at the inside wall of the packed column; and electrical connection being made so that a first electric signal of the height of the packed layer is transmitted from the interface-detecting element to a controller constituted of a signal converter, an electric current generator, an addition-computing element, and an adjuster; and a second electric signal is transferred from the liquid-level detector provided at the top of the column to the adjuster; and output signal is transmitted from the adjuster to the first controller of the liquid-feed piping and the second controller of the discharging piping.

2. The apparatus of claim 1, wherein the liquid-level detecting element is an ultrasonic type level meter.

3. The apparatus of claim 1, wherein the interface-detecting element is a vibrator type level sensor.

4. The apparatus of claim 1, wherein the packed layer comprises an ion-exchange resin or a highly porous polymer.

5. The apparatus of claim 1, wherein a plurality of interface-detecting element are provided internally on the side wall of the packed column with a spacing so as to detect the whole range of positional variation of the interface between the packed layer and the retained liquid layer.

* * * * *